(12) United States Patent
Barrett

(10) Patent No.: US 8,324,905 B2
(45) Date of Patent: Dec. 4, 2012

(54) AUTOMATIC VARIABLE GAIN AMPLIFIER

(75) Inventor: Jeffrey B. Barrett, Bolton, MA (US)

(73) Assignee: Woodward, Inc., Fort Collins, CO (US)

( * ) Notice: Subject to any disclaimer, the term of this patent is extended or adjusted under 35 U.S.C. 154(b) by 509 days.

(21) Appl. No.: 12/714,975

(22) Filed: Mar. 1, 2010

(65) Prior Publication Data

US 2011/0210744 A1 Sep. 1, 2011

(51) Int. Cl.
G01N 27/62 (2006.01)
F02P 17/00 (2006.01)
G01L 23/22 (2006.01)
(52) U.S. Cl. ........ 324/464; 324/468; 324/380; 73/35.08
(58) Field of Classification Search .................. 324/464, 324/459–463, 378, 380, 399, 402, 465–470; 73/35.08, 35.06, 35.03, 35.01
See application file for complete search history.

(56) References Cited

U.S. PATENT DOCUMENTS

| 3,739,260 | A | * | 6/1973 | Schadler | 324/468 |
| 5,301,537 | A | * | 4/1994 | Atkinson | 73/40 |
| 5,563,332 | A | * | 10/1996 | Yasuda | 73/35.08 |
| 5,755,206 | A | * | 5/1998 | Takahashi et al. | 123/406.37 |
| 6,202,474 | B1 | * | 3/2001 | Takahashi et al. | 73/35.08 |
| 6,922,628 | B2 | * | 7/2005 | Zhu et al. | 701/111 |
| 7,164,271 | B2 | * | 1/2007 | Ando | 324/380 |
| 2002/0066444 | A1 | * | 6/2002 | Ikeda et al. | 123/606 |
| 2006/0158195 | A1 | * | 7/2006 | Ando | 324/380 |

* cited by examiner

Primary Examiner — Hoai-An D Nguyen
(74) Attorney, Agent, or Firm — Reinhart Boerner Van Deuren P.C.

(57) ABSTRACT

An automatic variable gain amplifier is provided. The automatic variable gain amplifier automatically adjusts the amplification of a signal, and in one embodiment, an ion signal, based on the amplitude of the peaks of the signal. The automatic variable gain amplifier detects the peaks of the signal, compares them to a threshold value, and, based on this comparison, varies the amount by which the signal is amplified. The automatic variable gain amplifier produces a composite output waveform for an input waveform with an amplitude that may vary over a plurality of orders of magnitude.

20 Claims, 3 Drawing Sheets

AUTOMATIC VARIABLE GAIN AMPLIFIER

FIELD OF THE INVENTION

Embodiments of the present invention generally relate to ion current sense circuits for sensing ion current generated during the combustion event in an engine, and, more particularly, to amplifier circuits for use therewith.

BACKGROUND OF THE INVENTION

In the past it was difficult to determine the performance characteristics of an engine due to the fact that it was difficult to determine what was taking place within the combustion chamber of the engine. With the advent of ion sensing came the ability to determine the characteristics of combustion within a combustion chamber, allowing one to determine whether a fuel mixture was too rich or too lean and whether knocking or good combustion was taking place.

Ion sensing relies on the fact that combustion in an engine creates measurable ionized gas. In such an engine an ion sensor may be installed or, with proper circuitry, the ignition spark plug may be used to sense ion current without installing additional sensors. The ion sensor generates a small current that flows through the ionized gas in the combustion chamber, and amplifier circuitry is used to allow analysis of the combustion ion signal to diagnose engine performance characteristics.

Testing has identified that the combustion ion signal of a reciprocating engine, for instance, includes a first ion peak and a second ion peak. The first ion peak is due to the chemical ionization of the fuel and air in, or very near, the spark gap (if a spark plug is used) or the ion sensor. The second ion peak, or thermal peak, occurs after most of the fuel is burned and the remaining ion density near the sensor is approximately proportional to overall cylinder pressure.

Analysis of each of the ion peaks provides different combustion information. The second peak has been studied for some time and correlates with the peak cylinder pressure and indicates the location of the peak temperature, knock, and misfire, for example.

Difficulty has arisen, however, with regards to analysis of the first peak. Part of this difficulty is because the first peak can be 20 to 100 times the amplitude of the second peak. Prior ion amplifier circuits have been of a fixed, high gain type, optimized for amplifying the amplitude of the very small second peak. However, due to the high dynamic range between the two peaks, these prior ion amplifier circuits were unsuitable for analysis of the first peak. This is because the relatively large amplitude of the first peak compared to the second peak, such amplifiers often clipped this peak or became saturated, resulting in an unusable ion signal output for analysis.

There is a need in the art, therefore, for an amplifier circuit capable of interfacing with an ion sensor that is capable of producing a related output signal that can be used by a typical Electronic Control Unit (ECU) to analyze both the first ion peak and the second ion peak.

Embodiments of the present invention provide such a solution. These and other advantages of the invention, as well as additional inventive features, will be apparent from the description of the invention provided herein.

BRIEF SUMMARY OF THE INVENTION

In view of the above, embodiments of the present invention provide a new and improved amplifier for use with an ion sensor that overcomes one or more of the problems existing in the art. More particularly, embodiments of the present invention provide a new and improved automatic two gain amplifier for use with an ion sensor. Still more particularly, embodiments of the present invention provide an amplifier capable of producing a useful combustion ion signal that accurately represents both the first ion peak and the second ion peak of an ion current signal generated during a combustion event in an engine.

Preferably, embodiments of the amplifier are capable of producing a useful ion signal for use with sensors in stoichiometric reciprocating engines, turbine engines, diesel particulate filters, and any other devices that produce an ion signal that has an amplitude that varies over a plurality of orders of magnitude.

In one embodiment, the automatic two gain amplifier includes a comparator. The comparator is arranged and configured to interface with a peak detector and to compare the output of the peak detector with a threshold value. The comparator is also configured to control a variable amplifier. The variable amplifier is configured to amplify the ion signal produced by an ion sensor, for example, in the combustion chamber of an engine. When the output of the peak detector exceeds the threshold value, the comparator configures the amplifier not to amplify the ion signal or to only amplify the ion signal by a relatively small amount. When the output of the peak detector is less than the threshold value, the comparator configures the amplifier to amplify the ion signal by a relatively large amount.

Thus, when the ion signal has a relatively small amplitude, e.g. during the second peak, it can be amplified before being analyzed. When the ion signal has a relatively large amplitude, e.g. during the first peak, it will not be over-amplified, but instead will be amplified only a small amount, or not amplified at all, before being output for analysis. Thus, both a small amplitude ion signal and a large amplitude ion signal can be automatically amplified the proper amount, and the amplifier will output an accurate and usable signal for analysis, even for an ion signal that varies across a diverse range of amplitudes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
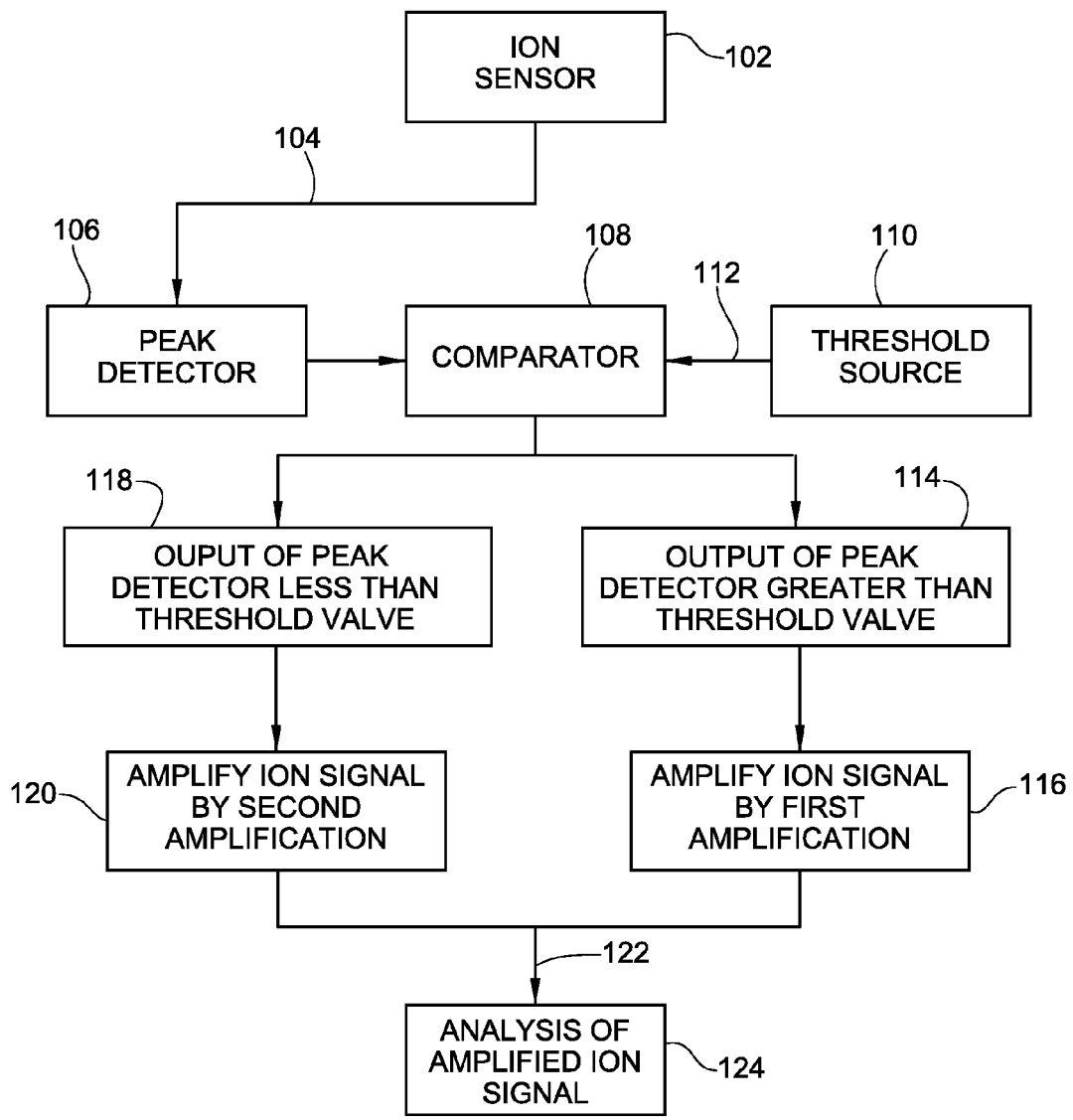
FIG. 1 is a block diagram illustrating the functionality of an embodiment of an automatic two gain amplifier interfaced with a peak detector and an ion signal source in accordance with the teachings of the present invention.

Turning now to the drawings, there is illustrated in FIG. 1 an embodiment of an automatic two gain ion amplifier 100 particularly well suited for conditioning an ion current sense signal generated in the combustion chamber of a lean burn reciprocating engine. However, while the following description will utilize such an exemplary environment in describing various features and functionality of embodiments of the present invention, such description should be taken by way of example and not by way of limitation. Indeed, embodiments of the present invention may find use with ion sensor controls for stoichiometric reciprocating engines, turbine engines, and diesel particulate filters, to name just a few.

As an overview of the system operation and with reference to FIG. 1, in one embodiment an ion sensor 102 positioned with a combustion chamber of an engine senses ion current flow and outputs an ion signal 104 to a peak detector circuit 106. This peak detector circuit 106 tracks the peak amplitude of the ion signal 104. The comparator 108 compares the output of the peak detector 106 with the threshold value 112 provided by the threshold source 110.

When the output of the peak detector 106 is greater than 114 the threshold value 112, the ion signal 104 will be amplified by a first value 116. In the exemplary application of a reciprocating combustion engine, the ion signal 104 will typically be larger than the threshold value 112 at or around the time of a first ion peak. As discussed above, this first ion peak will typically be due to the chemical ionization of the fuel and air in or very near the spark gap or ion sensor. Because this first ion peak typically has a relatively large amplitude as compared to the second peak, the first value for amplification will be small if any, e.g. a gain of 1.

If, however, the output of the peak detector 106 is less than 118 the threshold value 112, the ion signal 104 will be amplified by a second value 120. In the exemplary application of a reciprocating combustion engine, the ion signal 104 will typically be smaller than the threshold value 112 at or around the time of a second ion peak. As discussed above, this second ion peak, also referred to as the thermal peak, has a better correlation with the peak cylinder pressure, and occurs after most of the fuel is burned and the remaining ion density near the ion sensor 102 is approximately proportional to the overall cylinder pressure. Because this second ion peak typically has a relatively smaller amplitude than the first peak, possibly by orders of magnitude, the second value for amplification will be much larger than the first value, e.g. 30.

Following amplification either by the first amount of amplification 116 or by the second amount of amplification 120, the now amplified ion signal 122 is output for analysis 124 or storage for later analysis. The amplified ion signal 122 may be output, for example, to an Engine Control Unit (ECU) or other controller for combustion parameter detection or ion signal processing in one embodiment.

Figure 2:
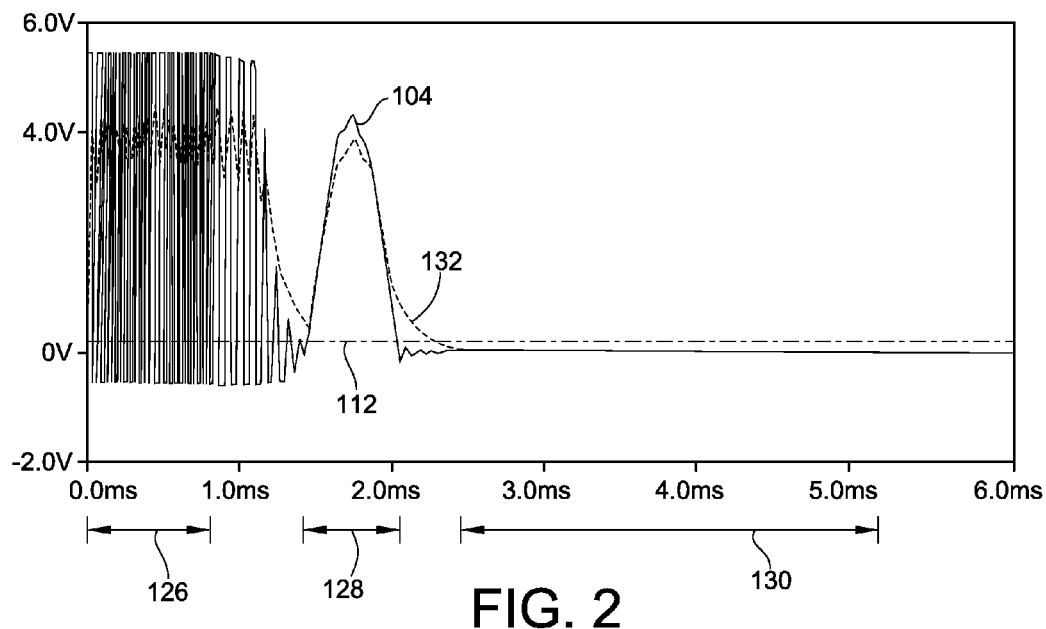
FIG. 2 is a graphical illustration of an ion signal and a peak detector output.

FIG. 2 graphically illustrates the problem of adequately analyzing the two peaks of an ion signal 104. Specifically, the ion signal 104 in this exemplary embodiment typically has three main phases, to wit, a sparking period 126, a first peak region 128, and a second peak region 130. FIG. 2 also shows some coil ringing that occurs after the sparking period 126 and the first peak region 128. Because of the relative magnitudes of the first peak and the second peak, this second peak cannot be adequately viewed in this FIG. 2. As is clear, however, this second peak, or more particularly the output 132 of the peak detection circuitry, is below the threshold 112 for use in determining which gain to use in the amplifier circuitry to be discussed below.

In this exemplary application, the ignition coil of the engine is sparking during the sparking period 126 causing the high amplitude peaks and high frequency fluctuation of the ion signal 104 illustrated in FIG. 2. Shortly after the ignition coil of the engine stops sparking, the first peak period 128 begins, during which the ion sensor 102 will output the first peak due to changes in conditions inside the combustion chamber of the engine. The first peak output of the ion sensor 102 will have a high amplitude, in the exemplary embodiment the first peak is approximately 4.0 volts and 144 microamperes. The output 132 of the peak detector tracks this high amplitude ion signal 104 value during the first peak period 128. The output 132 of the peak detector will have an amplitude slightly less than the ion signal 104 due to the fact that in this embodiment an ideal diode is not used. Instead, a silicon diode, which has a forward voltage drop of, for example, 0.7V is used, creating an output of the peak detector 132 which is slightly lower than the ion signal 104.

After the first peak period 128, due to changing conditions in the engine's combustion chamber, the ion current signal 104 generates a second peak during the second peak period 130. The amplitude of the second peak is much smaller than the amplitude of the first peak, on the order of less than half a volt and approximately 2 microamperes in the illustrated embodiment. As may be seen, the output 132 of the peak detector is below the threshold 112 during the entire second peak period 130. During this second peak period 130, the second peak of the ion signal 104 cannot effectively be analyzed because its amplitude is too small, particularly as compared with the first peak.

Figure 3:
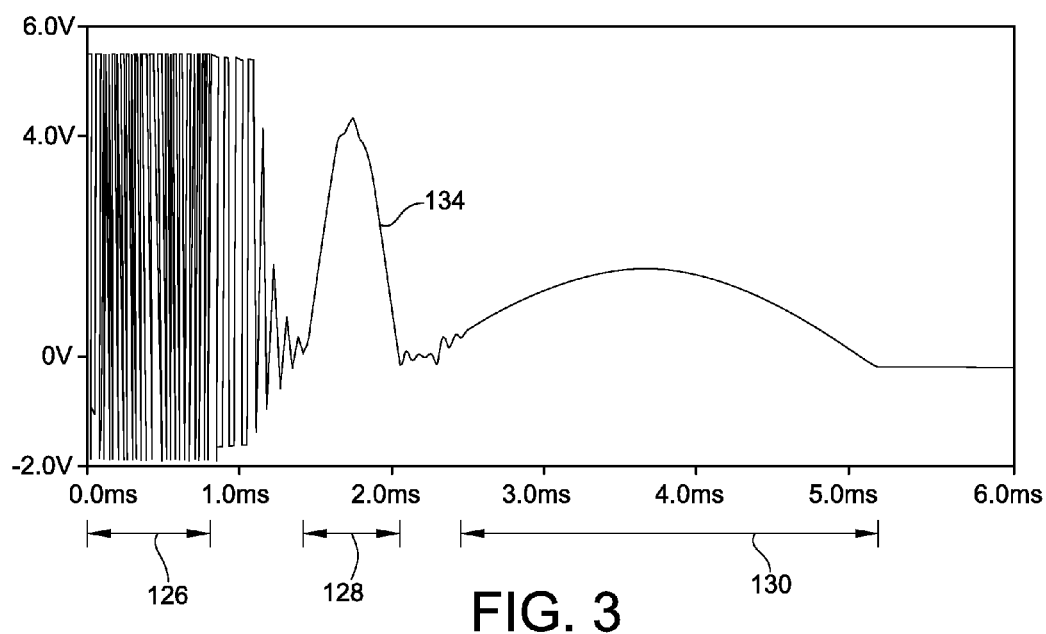
FIG. 3 is a graphical illustration of an output signal of an embodiment of an automatic two gain amplifier in accordance with the teachings of the present invention.

However, the variable amplification employed by embodiments of the present invention allows for both peaks to be effectively analyzed. The result of this variable amplification can be seen through an analysis of FIG. 3, which represents the amplified output 134 of the ion signal 104 of FIG. 2.

During the sparking period 126, the automatic two gain amplifier 100 remains in a low-gain mode, amplifying the ion signal 104 by only a small amount (in this embodiment a gain of only 1), because the amplitude of the output of the peak detector 132 (see FIG. 2) is greater than the threshold value 112. During the first peak period 128, the output of the peak detector 132 is again (still) greater than the threshold value 112. As such, the automatic two gain amplifier 100 remains in its low gain mode, using a gain of only 1, to generate the output signal 134 shown in FIG. 3.

After the first peak period 128 has ended, the output of the peak detector 132 drops below the threshold value 112 as seen in FIG. 2. This causes the automatic two gain amplifier 100 to switch from its low gain mode to a high gain mode. During this high gain mode, the automatic two gain amplifier 100 utilized a much larger gain, e.g. a gain of 30 in the illustrated embodiment, to amplify the ion signal 104. As may be seen from FIG. 3, during the second peak period 130, the automatic two gain amplifier 100, now in high gain mode, greatly amplifies the ion signal 104 so that the second peak is now clearly visible in the output 134, and can effectively be analyzed by the same analysis circuitry used for analysis of the first peak.

Figure 4:
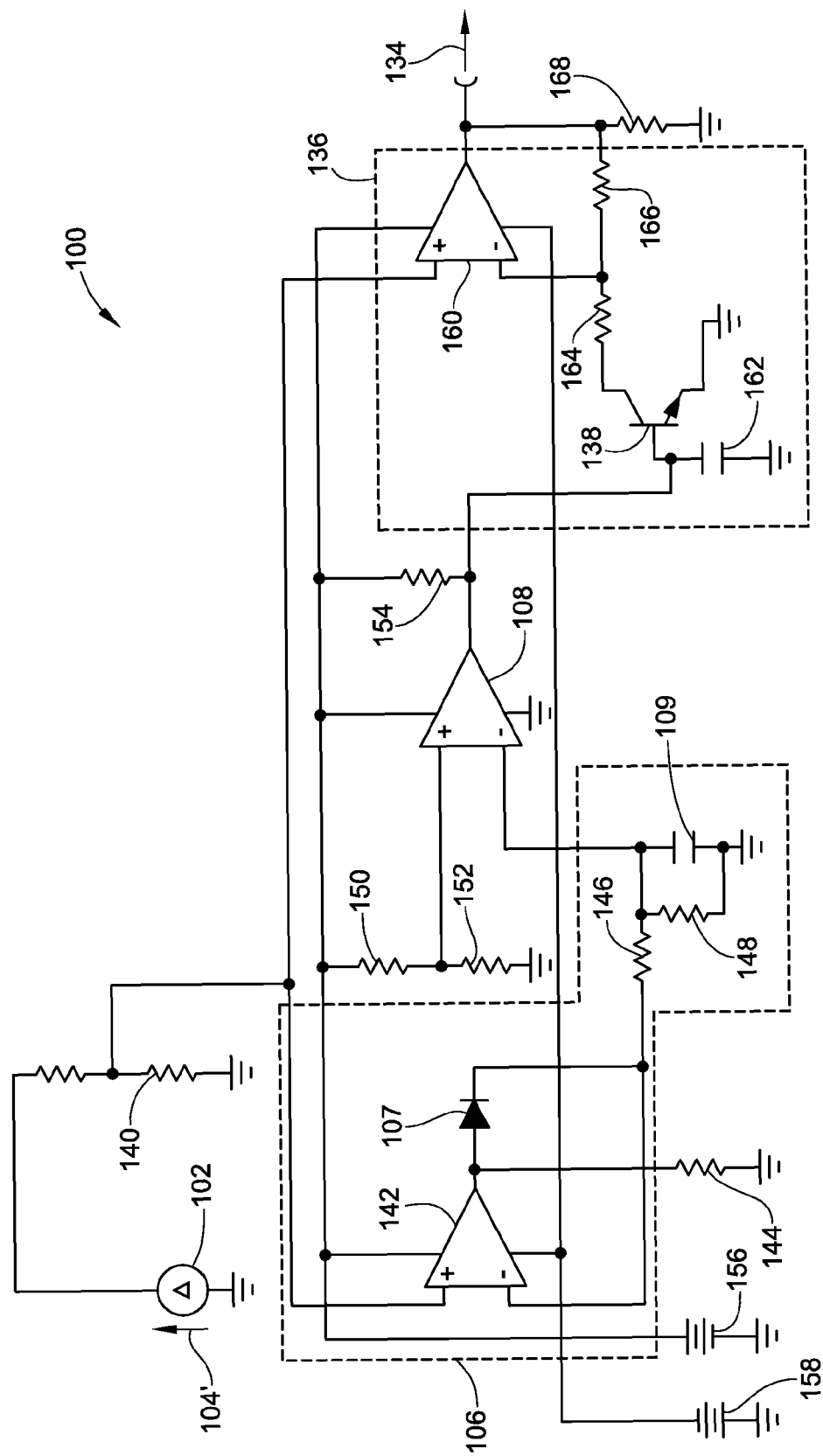
FIG. 4 is a schematic illustration of an embodiment of an automatic two gain amplifier in accordance with the teachings of the present invention.

FIG. 4 illustrates one embodiment of a hardware implementation of the automatic two gain amplifier 100 constructed in accordance with the teachings of the present invention. An illustrated, an ion sensor 102 is provided to sense the ion current in the combustion chamber of the engine. As discussed above, this ion sensor 102 may be a dedicated ion sensor or may be an ignition spark plug. In any event, the ion sensor 102 detects the ionization within the combustion chamber and outputs the ion current signal 104'. The ion current signal 104' flows through a sense resistor 140 to develop the ion signal 104 (voltage) illustrated in FIG. 2. This ion signal 104 is input to the peak detector circuit 106 and to the amplification circuit 136 as will be discussed in detail below.

In the illustrated embodiment the peak detector 106 includes an operational amplifier 142 configured as a voltage follower, with an output resistor 144 and blocking diode 107. The peak detector 106 also includes the resistor 146, 148 capacitor 109 combination that determines the tracking response time of the peak detector 106 output to the comparator 108. As will be apparent to those skilled in the art, the output of the operational amplifier 142 charges the capacitor 109 through resistor 146 to or approximately to the peak of the ion signal 104. As the ion signal 104 falls below the voltage stored on the capacitor 109, the diode 107 becomes reverse biased, and the capacitor 109 then discharges through resistor 148. The values of resistors 146, 148 and capacitor 109 may be varied to vary the tracking response time of the peak detector circuit 106.

As shown in FIG. 4, this peak tracking voltage on capacitor 109 is input to the comparator 108. The threshold value for comparison with the voltage on capacitor 109 is set by the resistor divider of resistors 150 and 152 coupled to the supply source 156 (supply source 158 providing the negative supply for the operational amplifiers 142, 160 in the illustrated embodiment). The comparator 108 compares the instantaneous output of the peak detector 132 with this threshold value.

When the peak value is greater than the threshold, the output of the comparator 108 is low which pulls down the voltage on capacitor 162, the operation of which will be described more fully below with regard to the amplification circuit 136. When the peak value is less than the threshold, the output of the comparator goes high. This allows capacitor 162 to charge through resistor 154, turning on transistor 138 and changing the gain of the amplification circuit 136 as will be discussed below. When the peak of the ion signal 104 again rises above the threshold, the output of comparator 108 goes low, discharging capacitor 162 and turning off transistor 138, to return the gain of the amplification circuit 136 to its previous value. Although not shown for simplicity, it is expected that one skilled in the art may employ hysteresis within the comparator 108 circuits as appropriate to prevent oscillations or false triggering due to noise.

Turning now specifically to the amplification circuit 136, the operational amplifier 160 receives the ion signal 104 on its non-inverting input and outputs the amplified output 134 for use by, in an exemplary environment, an ECU or other engine controller. The gain of operational amplifier 160 is set by resistors 164, 166, depending on the operational state of transistor 138. That is to say, during the period when transistor 138 is off (corresponding to a low output from comparator 108 generated because the peak value of the ion signal 104 is above the threshold as discussed above), the gain of the operational amplifier 160 is unity determined by the un-attenuated feedback of resistor 166. In this embodiment, this gain is set to one to allow the amplified output 134 to follow the actual first peak of the ion signal 104 without being clipped or saturating as was the case with prior circuits that only had a single gain set to allow analysis of the second peak. Further, during the period when transistor 138 is on (corresponding to a high output from comparator 108 generated because the peak value of the ion signal 104 is below the threshold as discussed above), the gain of the operational amplifier 160 is determined by resistors 164, and 166 forming a feedback voltage divider. In one embodiment, this gain is set to 30 to allow substantial amplification of the ion signal 104 so that the second peak of the ion signal 104 can be analyzed. Resistor 168 is simply an output load resistor.

The foregoing has been described with respect to an exemplary lean burn reciprocating engine. However, the present application need not be limited to such an exemplary application. Instead, embodiments of the automatic two gain amplifier of the present application may be used in conjunction with a stoichiometric reciprocating engine, a turbine engine, a diesel particulate filter, or any other application in which two ion signal peak amplitudes are of interest but differ by orders of magnitude.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An automatic two gain amplifier for use in conditioning an ion current signal sensed by an ion sensor in a combustion chamber of an engine, comprising:

an ion peak detector configured to receive the ion current signal from the ion sensor, the ion peak detector generating a an ion peak detector output approximating a peak magnitude of the ion current signal;

a comparator coupled to the ion peak detector and configured to compare the ion peak detector output with a threshold value, the comparator generating a first output when the ion peak detector output is greater than the threshold value and a second output when the ion peak detector output is less than the threshold value; and an amplification circuit operatively coupled to the comparator and configured to receive the ion current signal, and the amplification circuit further configured to amplify the ion signal by a first amplification when the first output is generated by the comparator and to amplify the ion signal by a second amplification when the second output is generated by the comparator.

2. The amplifier of claim 1, wherein the first amplification is less than the second amplification.

3. The amplifier of claim 1, wherein the amplification circuit includes a control switch operative to change state when the comparator changes from the first output to the second output to change amplification from the first amplification to the second amplification.

4. The amplifier of claim 3, wherein the amplification circuit includes an operational amplifier having a first feedback resistor configured to establish a gain thereof to provide the first amplification, and wherein the control switch operatively adds a second voltage dividing resistor to change the gain of the operational amplifier to provide the second amplification.

5. The amplifier of claim 4, wherein the control switch includes a transistor coupled between the second resistor and ground.

6. The amplifier of claim 1, wherein the first amplification is approximately unity.

7. The amplifier of claim 6, wherein the second amplification is approximately 30.

8. The amplifier of claim 1, wherein the second amplification is at least an order of magnitude greater than the first amplification.

9. The amplifier of claim 1, wherein the threshold value is set to approximately five percent of a maximum first peak of the ion current signal.

10. The amplifier of claim 1, wherein the comparator generates the second output when the ion current signal is below approximately seven microamperes.

11. A method of conditioning an ion current signal generated by an ion current sensor positioned within a combustion chamber, the ion current signal having a first peak and a second peak that may be twenty to one hundred times smaller than the first peak, comprising the steps of:
converting the ion current signal to a voltage signal;
tracking a peak magnitude of the voltage signal;
comparing the peak magnitude to a threshold; and
amplifying the voltage signal by a variable gain based on a relationship between the peak magnitude and the threshold.

12. The method of claim 11, wherein the step of amplifying comprises the steps of:
amplifying the voltage signal by a first gain when the peak magnitude is greater than the threshold; and
amplifying the voltage signal by a second gain when the peak magnitude is less than the threshold.

13. The method of claim 12, wherein the step of amplifying the voltage signal by the first gain when the peak magnitude is greater than the threshold comprises the step of amplifying the voltage signal by unity when the peak magnitude is greater than the threshold.

14. The method of claim 12, wherein the step of amplifying the voltage signal by the second gain when the peak magnitude is less than the threshold comprises the step of amplifying the voltage signal by approximately thirty when the peak magnitude is less than the threshold.

15. The method of claim 11, wherein the step of amplifying comprises the steps of:
amplifying the voltage signal by a first gain during at least the first peak of the ion current signal; and
amplifying the voltage signal by a second gain during at least the second peak of the ion current signal.

16. The method of claim 11, wherein the step of amplifying comprises the steps of:
switching a gain from a high gain to a low gain when the step of comparing indicates that the peak magnitude is greater than the threshold; and
switching the gain from the low gain to the high gain when the step of comparing indicates that the peak magnitude is less than the threshold.

17. The method of claim 16, wherein the step of switching the gain from the high gain to the low gain comprises the step of reducing the gain by at least an order of magnitude.

18. The method of claim 16, wherein the step of switching the gain from the low gain to the high gain comprises the step of increasing the gain by at least an order of magnitude.

19. An ion current signal conditioning circuit for use in the control of an engine, the ion current signal having a first peak and a second peak, comprising:
an ion current sensor positioned within a combustion chamber of the engine;
a resistor coupled to the ion current sensor to generate an ion current voltage signal thereacross;
an ion peak detector configured to receive the ion current voltage signal, the ion peak detector generating a an ion peak detector output approximating a peak magnitude of the ion current voltage signal;
a comparator coupled to the ion peak detector and configured to compare the ion peak detector output with a threshold value, the comparator generating a first output when the ion peak detector output is greater than the threshold value and a second output when the ion peak detector output is less than the threshold value; and
an amplification circuit operatively coupled to the comparator and configured to receive the ion current signal, and the amplification circuit further configured to amplify the ion signal by a first amplification when the first output is generated by the comparator and to amplify the ion signal by a second amplification when the second output is generated by the comparator.

20. The ion current signal conditioning circuit of claim 19, wherein the amplification circuit includes a control switch operative to change state when the comparator changes from the first output to the second output to change amplification from the first amplification to the second amplification, and wherein the amplification circuit includes an operational amplifier having a first feedback resistor and a second voltage dividing resistor configured to establish a gain thereof to provide the first amplification, and wherein the control switch operatively adds a second voltage dividing resistor to change the gain of the operational amplifier to provide the second amplification.

* * * * *